Patented Sept. 9, 1952

2,610,125

UNITED STATES PATENT OFFICE 2,610,125

EDIBLE FATTY MATERIAL

Emery I. Valko, Mountain Lakes, N. J., assignor to E. F. Drew & Co., Inc., New York, N. Y., a corporation of Delaware No Drawing. Application November 16, 1949, Serial No. 127,764

5 Claims. (Cl. 99—123)

The present invention is directed to edible fatty compositions such as those used as shortening or as liquid fats for various culinary purposes.

In recent years, it has become quite popular to provide shortening compositions having an added ingredient which improves the properties of the shortening in a number of respects. Only small amounts of the addition agents were used, say, up to 5%, with the result that spattering of the fat when used in frying was generally eliminated. With higher amounts of the addition agent, a shortening was obtained which, when added to a cake batter of high ratio, wherein the amount of sugar present is greater than the flour, produced a fluffy baked product.

Up to the present time, the compounds added to the shortening to obtain the beneficial results were partial esters of glycerine and the higher fatty acids, namely, those having 16 to 18 carbon atoms. The substances so added were mono- and diglycerides of said fatty acids. It was considered that the addition agent must have one or more free OH groups which are hydrophilic in character. It was the presence of such free OH groups present in the unesterified portion of the glycerine which gave the effect desired in culinary operations, and it was considered that substances not having substantial amounts of free OH groups would not give the results.

The present invention is directed to the use of substances other than those having free OH groups of basic character for the purpose of improving shortenings, lard and the like for various uses in cooking and baking. The invention is based upon the discovery that certain neutral esters of polymerized glycols with higher fatty acids wherein the OH groups of the glycol are combined with the fatty acids, gave a product which has excellent properties as an addition agent to fats and oils for culinary use.

The polyglycol is taken from the class consisting of ethylene and propylene glycols. Such glycols are polymerized to an extent where there are at least 5 glycol radicals in the molecule. The molecular weight of such a polyglycol ranges from 400 to 2500.

The fatty acid used for esterification with the polyglycol is a higher fatty acid having from 12 to 22 carbon atoms. Natural fatty acids having even numbers of carbon atoms and occurring in vegetable and animal oils are particularly suitable for the purpose. Acids having odd numbers of carbon atoms may also be used in the esters. The polyglycol may be esterified with a single, relatively pure higher fatty acid or a mixture of two or more such fatty acids.

The following are specific examples illustrating various esters which have been found suitable for incorporation in shortening or the like.

*Example 1*

A mixture of fatty acids derived from coconut oil by splitting of the oil and fractionally distilling the fatty acids is used. The mixture consists essentially of about 20% myristic acid, 55% lauric acid, 10% palmitic acid, and the remainder a mixture of other acids, such as oleic and others occurring in coconut oil. The molecular weight of the mixed acids is about 219 and the free fatty acid value is 129%.

A mixture is made of 1 mol. of a polyethylene glycol having an average molecular weight of 1000, with about 2.2 mols. of the above identified mixture of fatty acids. This constitutes approximately 10% excess of acid over that necessary to form the diester.

The mixture is gradually heated over a period of about 1½ hours until a temperature of 225° C. is reached. Foaming takes place during the rise in temperature and the rise is adjusted so as to control the amount of foaming so that it does not become excessive. A gradually increasing vacuum is applied from the beginning of the operation until it is completed. The heating is continued at the range of 225° to 232° C. for a total of about 11 hours in order to substantially complete the reaction. The vacuum is gradually increased so that the pressure is about 50 mm. of mercury after 3 hours, and is from 15 to 20 mm. for the remainder of the heating cycle.

The product has a free fatty acid value of 6.2%. It is subjected to distillation in a vacuum with steam refining, whereby the fatty acid content is reduced to about 3.0%. The resulting product is solid at room temperature and melts at about 40° C. It is white, with a slightly yellow tinge.

A hydrogenated fat is melted and 1% by weight of the diester is incorporated therein while in the molten state. Then it is subjected to a beating in order to introduce a substantial quantity of air, say, from 10% to 20% into the mixture, whereby a creamy consistency is obtained. At the same time, the composition is chilled rapidly in an internal chilling machine.

*Example 2*

A fatty acid consisting essentially of stearic acid is used. It is derived from hydrogenated soya bean oil which is first split to form free fatty acids and then frictionally distilled. The stearic acid has an iodine number of less than 3.

One mol. of a polypropylene glycol, having an average molecular weight of 575, is mixed with 2.3 mols. of the above described commercial stearic acid. The mixture is heated over a period of one hour to a temperature of 225° C. A vacuum is applied from the beginning of the heating, gradually increasing until after one hour the pressure is about 50 mm. of mercury. Heating is continued at about 225° C. for a total period of about 17 hours while maintaining the vacuum between 35 and 55 mm. of mercury.

The final product is a hard solid which may be alkali refined and deodorized by steam. It has a free fatty acid value of .22.

The product is incorporated in a partially hydrogenated lard in an amount equal to .5% by weight. This gives an improved shortening which is very substantially superior to the hydrogenated lard for cooking and baking purposes.

*Example 3*

A mixture is made of 2.2 mols. of a commercial stearic acid consisting essentially of 45% stearic acid and 55% palmitic acids with 1 mol. of a polyethylene glycol having an average molecular weight of 1540.

The mixture is heated for about 1¼ hours up to 220° C. A vacuum is applied from the beginning of the operation, gradually increasing until after said period the pressure is 120 mm. of mercury. Heating is then continued at about 220° C., the total heating time being about 15 hours. During such heating, the vacuum is gradually increased until near the end of the operation the pressure is 50 mm. of mercury, which is maintained until the completion of the reaction.

The product may be steam refined or otherwise treated in a manner commonly practiced in the refining of edible oils and fats. The product is a soft, light-colored solid having a free fatty acid value of 1.9.

It is incorporated in a fully hydrogenated vegetable shortening in an amount equal to 5% by weight of the shortening. The taste of the product is very agreeable and it tends to impart an agreeable flavor to foods made therewith. When used for frying, it shows a smoke point of 385° F., which is considered quite good. In making high ratio baked goods with this shortening, a large volume is obtained, together with a very fine texture.

Baked goods made with shortenings as described herein have been found to be of excellent quality. Comparative tests were made with a shortening made in accordance with the present invention and containing from .8 to 1% of the emulsifying agents described herein, with a shortening made with 5% of monoglycerides of higher fatty acids known to the prior art. As a result of the taste, it was found that cakes made with the high ratio shortening of the present invention, and containing about 1% of the present emulsifiers, have a substantially better keeping quality than when made with the prior art high ratio shortening. The cake made with the present shortening is at least equal to that made with the prior art shortening in volume, appearance and edibility. In addition, from 15% to 18% less of the present shortening may be used than is specified by the standard formulas and still obtain all of the above desirable qualities.

While in the above mentioned tests the shortening contained 1% of the emulsifier, a considerably superior high ratio shortening is obtained if somewhat over 1%, and in the neighborhood of 1.5%, of the emulsifying agent is incorporated in the shortening. Still higher percentages of the emulsifying agent may be incorporated but in most cases it is unnecessary, to obtain satisfactory baked goods. This is in contrast to several times the amount of the prior art emulsifier which was necessary to give a good high ratio shortening.

The product of the present invention may be used for various other purposes where fats are applied. For instance, in frying it has some highly desirable properties. The smoke point is well over 400° F. and in a typical test, a smoke point of 428° F. was reached. It is believed that no other high ratio shortening previously produced had a smoke point of this value. Usually the high ratio shortenings containing monoglycerides and diglycerides of the higher fatty acids contain from 4% to 7% of such glycerides and usually the smoke point is below 360° F. and usually is closer to 300° F.

The emulsifying agents incorporated in the present invention are quite stable and may be stored for considerable periods of time without development of rancidity. The taste and flavor of the present product are equal or superior to the best prior art high ratio shortenings. The color thereof is quite satisfactory. The emulsifying value of the emulsifying agent is several times higher than that of mono and diglycerides of higher fatty acids, and it is quite economical to introduce such agents into the shortenings.

I claim:

1. An edible fatty composition consisting essentially of an edible fat having incorporated therein the diester of a polyglycol taken from the class consisting of ethylene and propylene glycols having a molecular weight of 400 to 2500 with at least one fatty acid having from 12 to 22 carbon atoms.

2. An edible fatty composition consisting essentially of an edible fat having incorporated therein the diester of a polyglycol taken from the class consisting of ethylene and propylene glycols having a molecular weight of 400 to 2500 with at least one fatty acid having from 12 to 22 carbon atoms, the diester constituting from .2% to 10% of said composition.

3. An edible fatty composition consisting essentially of an edible fat having incorporated therein the diester of a polyglycol taken from the class consisting of ethylene and propylene glycols having a molecular weight of 400 to 2500 with stearic acid.

4. An edible fatty composition consisting essentially of an edible fat having incorporated therein the diester of a polyglycol taken from the class consisting of ethylene and propylene glycols having a molecular weight of 400 to 2500 with a mixture of fatty acids consisting essentially of lauric, myristic, palmitic and oleic acids.

5. An edible fatty composition consisting essentially of an edible fat having incorporated therein the diester of a polyglycol taken from the class consisting of ethylene and propylene glycols having a molecular weight of 400 to 2500 with a mixture of fatty acids consisting essentially of lauric acid with a lesser quantity of fatty acids having from 14 to 18 carbon atoms.

EMERY I. VALKO.

REFERENCES CITED

The following references are of record in the file of this patent:

UNITED STATES PATENTS

| Number | Name | Date |
|---|---|---|
| Re. 19,425 | Harris | Jan. 15, 1935 |
| 2,109,842 | Harris | Mar. 1, 1938 |

OTHER REFERENCES

Serial No. 134,967, Schou (A. P. C.), published June 15, 1943.